(12) United States Patent
Schwarz (10) Patent No.: US 8,541,945 B2
(45) Date of Patent: Sep. 24, 2013

(54) LIGHTING DEVICE

(75) Inventor: Samuel J. Schwarz, Coos Bay, OR (US)

(73) Assignee: Schwarz Reliance LLC, Coos Bay, OR (US)

( * ) Notice: Subject to any disclaimer, the term of this patent is extended or adjusted under 35 U.S.C. 154(b) by 215 days.

(21) Appl. No.: 13/152,702

(22) Filed: Jun. 3, 2011

(65) Prior Publication Data

US 2011/0299274 A1    Dec. 8, 2011

Related U.S. Application Data

(60) Provisional application No. 61/351,841, filed on Jun. 4, 2010.

(51) Int. Cl.
*H01J 1/62* (2006.01)
*H01J 63/04* (2006.01)

(52) U.S. Cl.
USPC ........... 313/512; 313/498; 313/110; 313/112; 362/223; 362/246

(58) Field of Classification Search
USPC ................ 362/223, 248, 300, 307, 310, 317, 362/235, 311.01, 311.02, 311.03, 311.04, 362/355, 246, 217.02, 217.04; 313/110–113, 313/498–512
See application file for complete search history.

(56) References Cited

U.S. PATENT DOCUMENTS

| | | | |
|---|---|---|---|
| 6,503,364 B1 | 1/2003 | Masuda et al. | |
| 6,609,804 B2 | 8/2003 | Nolan et al. | |
| 7,553,051 B2 * | 6/2009 | Brass et al. | 362/373 |
| 2005/0011612 A1 | 1/2005 | Yakushiji et al. | |
| 2005/0052885 A1 | 3/2005 | Wu | |
| 2005/0254234 A1 * | 11/2005 | Wang | 362/184 |
| 2006/0227542 A1 | 10/2006 | Richmond | |
| 2007/0041183 A1 * | 2/2007 | Su | 362/191 |
| 2009/0207586 A1 * | 8/2009 | Arai et al. | 362/97.1 |
| 2010/0027270 A1 * | 2/2010 | Huang et al. | 362/310 |
| 2010/0097007 A1 | 4/2010 | Kamata et al. | |
| 2010/0165635 A1 * | 7/2010 | Chen et al. | 362/307 |
| 2010/0207534 A1 * | 8/2010 | Dowling et al. | 315/186 |

(Continued)

FOREIGN PATENT DOCUMENTS

| | | |
|---|---|---|
| KR | 10-1998-0068746 A | 10/1998 |
| KR | 10-2007-0109557 A | 11/2007 |

OTHER PUBLICATIONS

International Search Report/Written Opinion, PCT/US20011/039169, Dec. 23, 2011, ISA/KR, Korean Intellectual Property Office, Daejeon, Republic of Korea.

*Primary Examiner* — Anh Mai
*Assistant Examiner* — Kevin Quarterman
(74) *Attorney, Agent, or Firm* — Marger, Johnson & McCollom, P.C.

(57) ABSTRACT

Embodiment of the invention include a lighting device having a tubular current-conductive housing, a lamp assembly, an insulator sleeve, and a diffuser globe. The lamp assembly can include one or more lamps such as one or more light emitting diodes (LEDs). The diffuser globe is preferably a fumed blown glass diffuser globe having a concentrated region for refracting and diffusing light. The diffuser globe can include an internal diffuser for further refraction and control of the light. Embodiments also include a solar powered hook-shaped luminaire having a solar panel, a body member, and a diffuser globe. Embodiments further include a shatter resistant, portable, remote controllable, programmable, rechargeable, and floatable lighting device and/or globe luminaire, which can be automatically, manually, remotely, and/or locally controlled.

19 Claims, 7 Drawing Sheets

(56) References Cited

U.S. PATENT DOCUMENTS

2010/0213835 A1   8/2010  Mo et al.
2010/0290222 A1* 11/2010 Pickard et al. ............... 362/235
2010/0301731 A1* 12/2010 Morikawa et al. ........... 313/113
2011/0013403 A1*  1/2011 Hu ............................ 362/311.02

* cited by examiner

LIGHTING DEVICE

CROSS REFERENCE TO RELATED APPLICATION

This application claims the benefit of U.S. Provisional Patent Application Ser. No. 61/351,841, filed Jun. 4, 2010, which is incorporated by reference herein.

TECHNICAL FIELD

This disclosure relates to lighting devices, and, more particularly, to light emitting diode (LED) lighting diffuser globes and fixtures.

BACKGROUND

Light emitting diodes (LEDs) are becoming more common as a form of lighting. Due to their superior qualities in terms of energy efficiency, safety, ease of implementation, and the like, LEDs are becoming ubiquitous, having the potential to largely displace incandescent bulbs and other lighting technologies in the not too distant future. Early LEDs emitted a low-intensity red light, but modern development efforts yielded LEDs that have very high brightness across a broad spectrum of wavelengths. Even white light can now be produced using a combination of red, green, and blue LEDs, or by using a phosphor material.

One of the challenges associated with LED lighting involves the ability to effectively diffuse the light emitted by the LEDs. To achieve a certain level of practicality and pleasing emission of light, various efforts have been employed to guide, refract, and enhance the light emitted by the LEDs using lighting fixtures and the like. As the adoption rate of LED technology continues to rise, so too do efforts to make the LED light emissions more pleasing to the human eye.

Figure 1:
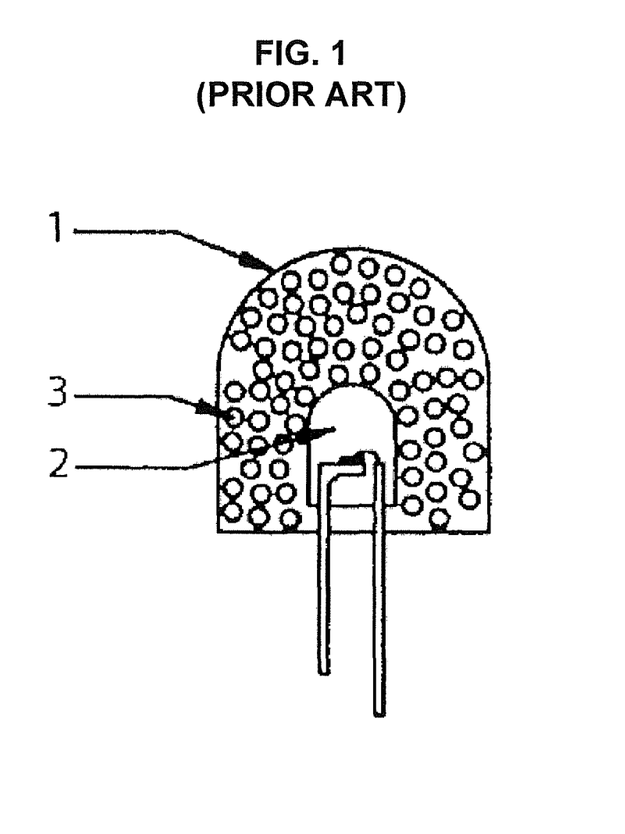
FIG. 1 illustrates a conventional LED lighting device.

For example, FIG. 1 shows a conventional approach to enhancing the emission of light from an LED. The encapsulated LED 2 is cast into the decorative part 1 with bubbles 3. The two parts are bonded together to form one entire part. The material used for the decorative part is typically resin. Multiple layers of bubbles 3 are created along the transmission path of the light beam to disperse the light produced by the LED 2. Others have attempted diffusion using glass pieces or light guides.

However, it is not enough to merely achieve a level of light dispersion using an LED fixture. The light fixture and dispersion level of light must be significant enough to be useful, and visually pleasing and attractive enough to evoke a positive reaction in the individuals using and observing the emitted light. For outdoor applications, the fixtures need to be durable, nice-looking, and practical.

These are only a few of the challenges presented by conventional approaches, which are impeding the wider adoption of LED technologies, and ultimately hurting efforts for energy independence and environmental responsibility.

Accordingly, a need remains for an improved lighting device, particularly one incorporating LED technology, for providing efficient light emissions on a grander scale. In addition, it would be desirable to have a LED lighting device incorporating a fumed diffuser globe, particularly one that is shatter resistant, portable, remote controllable, programmable, rechargeable, and floatable. Embodiments of the invention address these and other limitations in the prior art.

The foregoing and other features of the invention will become more readily apparent from the following detailed description, which proceeds with reference to the accompanying drawings.

DETAILED DESCRIPTION

Embodiments of the lighting devices described herein provide adequate and highly efficient lighting. Artisan-level craftsmanship in construction results in high quality production and overall longevity of the various embodiments of the lighting devices, including light fixtures or luminaires. The lighting devices or luminaires disclosed herein are recyclable and upgradable. As further described in the following detailed description, the disclosed lighting devices or luminaires are shatter resistant, portable, remote controllable, programmable, rechargeable, and floatable.

Figure 2A:
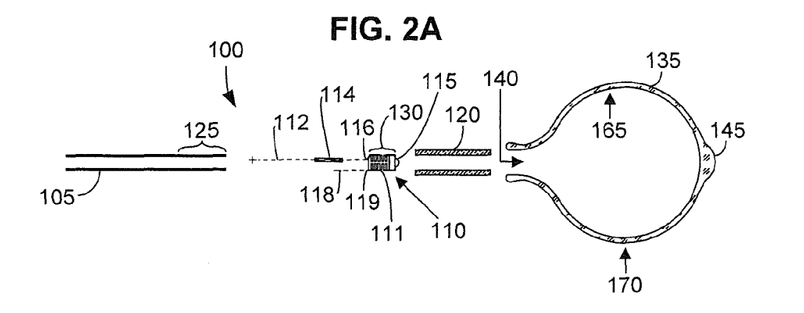
FIG. 2A illustrates an exploded view of a lighting device according to an example embodiment of the present invention.
Figure 2B:
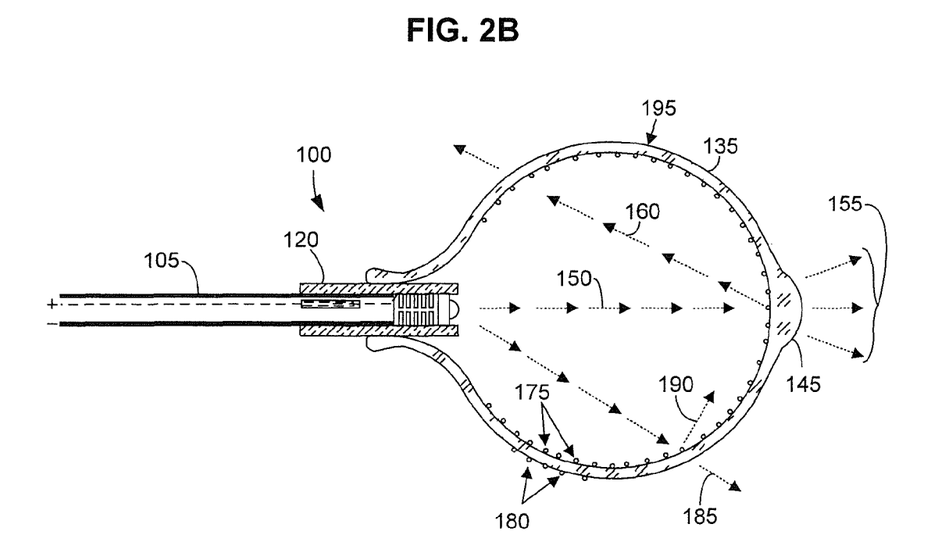
FIG. 2B illustrates a cross sectional view of an assembled lighting device of FIG. 2A.

FIG. 2A illustrates an exploded view of a lighting device 100 according to an example embodiment of the present invention. FIG. 2B illustrates a cross sectional view of an assembled lighting device 100 of FIG. 2A. Reference is now made to FIGS. 2A and 2B.

The lighting device 100 preferably includes a tubular soft copper current-conductive housing 105. It should be understood, however, that the housing 105 need not be tubular, nor current-conductive, but rather, can take any suitable shape and be comprised of any suitable insulating and/or current-conductive material.

The lighting device 100 can include a lamp assembly 110 coupled to the housing 105. The lamp assembly 110 can include one or more lamps 115. In some embodiments, the one or more lamps 115 are electrically coupled to the housing 105. An insulator sleeve 120 can be disposed around an end portion 125 of the housing 105 and around at least a portion 130 of the lamp assembly 110. The insulator sleeve 120 can be, for example, a length of clear rubber tube or sleeve.

A diffuser globe 135 can be compression fitted to the insulator sleeve 120 through an opening 140 thereof. The diffuser globe 135 can be blown borosilicate glass, Pyrex®, laboratory hard glass in the lampworking method and annealed to ensure maximum durability. It should be understood that other types of glass material, or alternatively, any suitable transparent or translucent material formable into a rigid shape, can be used to form the diffuser globe 135.

In some embodiments, the blown glass can be formed with a flame source, designed, blown, shaped and/or sized according to design specifications for the lighting device. The diffuser globes 135 need not be formed using human blowing techniques, but can also be formed using automated or machine based glass blowing techniques. The opening 140 of the diffuser globe 135 can be sized for compression fit and secured firmly onto the lamp assembly 110 over the insulator sleeve 120. In some embodiments, a steel or graphite rod (not shown) can be used to size the opening 140 for compression fitting with the lamp assembly and/or insulator sleeve 120. A silicon adhesive (not shown) may be used to ensure a waterproof connection of the diffuser globe 135 to the insulator sleeve 120 and/or the lamp assembly 110, particularly for outdoor applications.

The diffuser globe can include a concentrated region 145 that is structured to refract light 150 outwardly 155 from the diffuser globe 135 and inwardly 160 within the diffuser globe 135. The concentrated region 145 can be a lens and/or nipple shaped to aid in the refracting and diffusing of the light 155 emitted by the lamp 115. The lens or nipple can be a concentrated region of glass formed at various widths and depths, as further described below.

The inner surface 165 and/or outer surface 170 of the diffuser globe 135 can have deposited thereon silver (Ag) particulates 175 and/or 180 structured to reflect portions of the light 150 outwardly 185 from the diffuser globe 135 and inwardly 190 within the diffuser globe 135. More specifically, during formation one or more surfaces of the diffuser globe 135 can be subjected to a silver fuming process, which substantially covers the diffuser globe 135. The silver particulates aid in diffusing the light 160 and 190 emitted by the lamp 115. Gold (Au) can be used in lieu of or in addition to silver. The particulates 175 and/or 180 create a stunning and brilliant lighting effect as the beams of light are reflected and refracted in various directions. It should be understood that other suitable materials, including metals and/or non-metals, having reflective properties can be used as particulates 175 and/or 180.

The diffuser globe 135 can include a shatter resistant protective coating 195 disposed on an outer surface 170 thereof. The shatter resistant protective coating material 195 can include a poly or organic compound or other suitable material. The shatter resistant protective coating 195 can be applied to the diffuser globe 135 by dipping the diffuser globe 135 into a vat of shatter resistant coating material, and allowing the material to dry thereon. Alternatively, the shatter resistant coating material can be applied by spraying the material onto the diffuser globe 135. Thus, the beauty and utility of the blown glass diffuser globe 135 can co-exist with durability and safety features. In some embodiments, the protective coating 195 includes a fluorescence material, phosphorescent material, or other suitable material to give the diffuser globe 135 the quality of glowing in the dark, even after the lighting device 100 is turned off.

The lamp assembly 110 can include one or more light emitting diodes (LEDs) 115 and various conductors or wires in different configurations according to desired lighting types and applications. Positive current can be transferred through conductors or wires located within the housing 105. For example, a conductor 112 can transfer a positive current to the one or more LEDs 115. In some embodiments, the conductor 112 is coupled to a resistor 114, which is coupled to a positive terminal 116 of the one or more LEDs 115. The resistor 114 can be sized according to the lamp specification, wiring configuration and input from the power supply. The resistor 114 can be provided for continuous light output configurations of the LEDs 115.

In some applications such as chandeliers, where multiple diffuser globes are fitted to a body or frame (not shown), or when a body ground is required, or the like, the housing 105 itself can serve as a negative ground, and a negative terminal 119 of the one or more LEDs can be coupled to the housing 105 using a conductor 118.

In some embodiments, the lamp assembly 110 can include at least one low-power single wire LED 115, with the housing 105 grounded. Such a lighting device is suitable, for example, for chandeliers or surface-mount applications where multiple lighting devices are desired. In some embodiments, the lamp assembly 110 can include at least one low-power two-wire LED 115, or other suitable low-power multi-wire LED 115. Such a lighting device is suitable, for example, for pendants and other structures in which a single LED 115 is housed by 105. It should be understood that high-power LEDs, including single wire and/or multi-wire LEDs, can be used in the various lighting device embodiments disclosed herein. In general, high-power LEDs are rated at 1 watt or more, and low-power LEDs can be rated at less than 1 watt.

In some embodiments, the lamp assembly 110 can include at least one low-power or high-power red-green-blue (RGB) LED system 115. The RGB LED system 115 can include three positive conductors or wires and one ground conductor or wire. In some embodiments, the lamp assembly 110 can include at least one low-power or high-power, pre-assembled LED system.

The lamp assembly 110 can include a heat sink 111 for dissipating heat away from the LEDs 115. The heat sink 111 can be an aluminum heat sink, for example, placed in contact with the slug of the LEDs 115 to transfer heat away from the various components of the LEDs 115 (e.g., away from semiconductive materials and lens material).

FIGS. 3A, 3B, 3C, and 3D illustrate various diffuser globes 135 according to example embodiments of the present invention. Any of the diffuser globes 135 illustrated in FIGS. 3A, 3B, 3C, and 3D can be embodied in any configuration described herein.

Figure 3A:
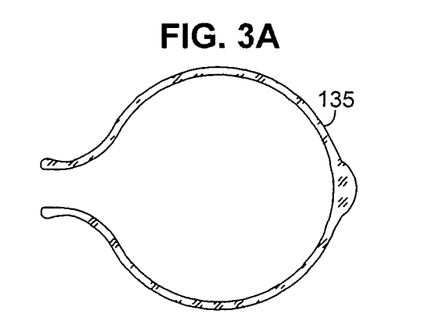
FIGS. 3A, 3B, 3C, and 3D illustrate various diffuser globes according to example embodiments of the present invention.
Figure 3B:
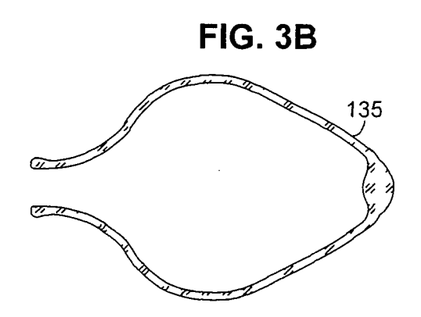
Figure 3C:
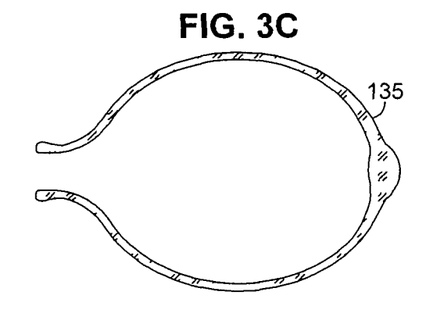
Figure 3D:
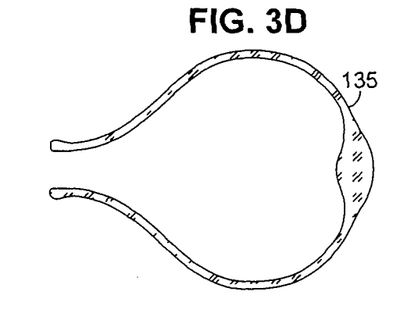

The various example shapes of the diffuser globes 135 described herein affect how the light is refracted or otherwise diffused from the diffuser globes 135. For instance, FIG. 3A illustrates an eye-shaped diffuser globe, the shape of which causes the light to be enhanced by the concentrated region and diffused in different directions from the diffuser globe 135 as described above. FIG. 3B illustrates a pear-shaped diffuser globe, which causes more light to be projected forward away from the back of the diffuser globe. FIG. 3C illustrates an oblong shaped diffuser globe in which light is extended in its reflections on the surfaces of the diffuser globe. FIG. 3D illustrates a compressed diffuser globe in which light is compressed in its reflections on the surfaces of the diffuser globe. It should be understood that other suitable shapes of the diffuser globe can be incorporated into the lighting devices described herein.

Figure 4:
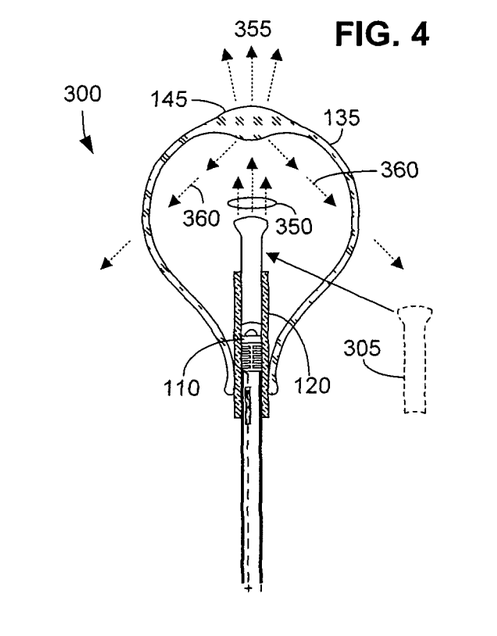
FIG. 4 illustrates a lighting device having an internal diffuser disposed within the diffuser globe according to another example embodiment of the invention.

FIG. 4 illustrates a lighting device 300 having an internal diffuser 305 disposed within the diffuser globe 135 according to another example embodiment of the invention. The internal diffuser 305 can be coupled to the lamp assembly 110 using the insulator sleeve 120. The internal diffuser 305 is structured to redirect at least a portion 350 of the light 350 toward the concentrated region 145 to increase the intensity of the light 355 emitted through the concentrated region 145. Another portion 360 of the light 350 can be reflected by the concentrated region 145 and emitted from different portions of the diffuser globe 135. In some embodiments, the internal diffuser 305 captures a percentage of the light emitted by the one or more LEDs 115, and reflects and/or redirects the light to the base of the diffuser globe 135.

Figure 5A:
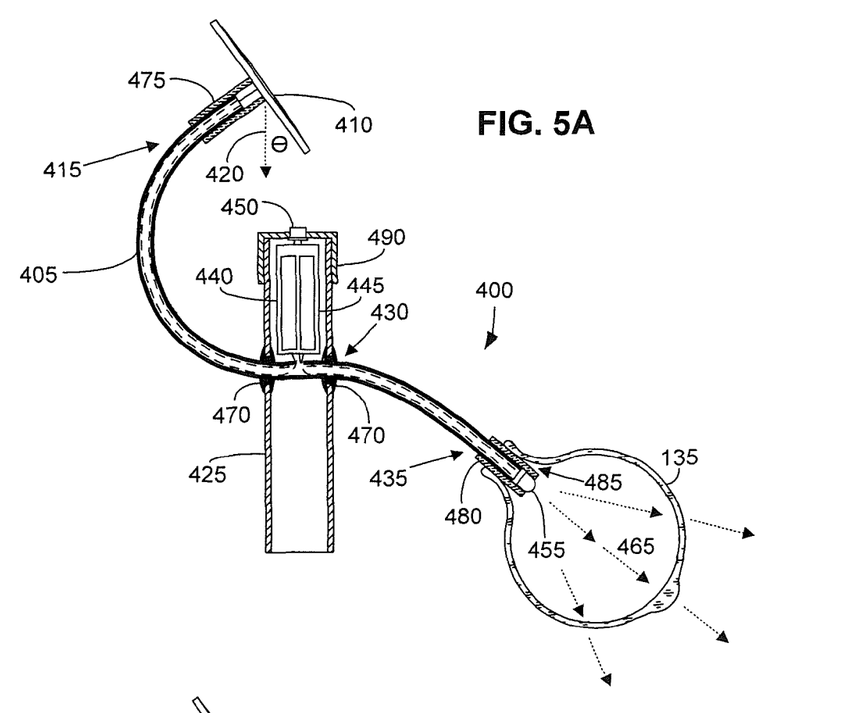
FIG. 5A illustrates a cross sectional view of a solar powered diffuser globe and fixture according to another example embodiment of the present invention.
Figure 5B:
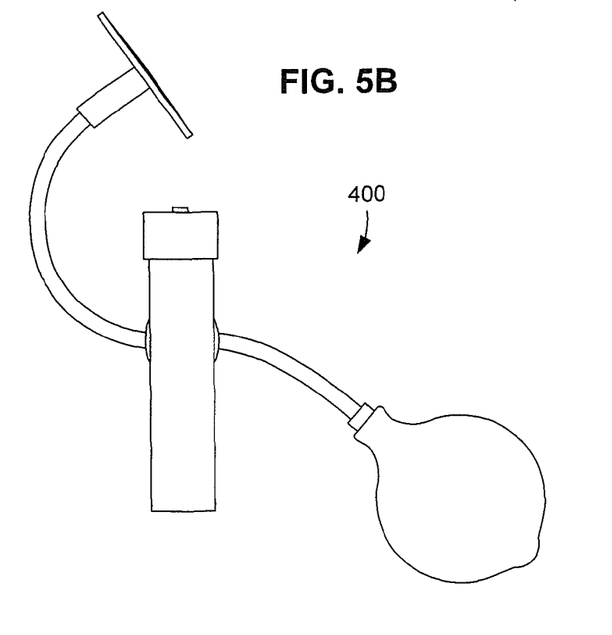
FIG. 5B illustrates a side elevation view of the solar powered diffuser globe and fixture of FIG. 5A.

FIG. 5A illustrates a cross sectional view of a solar powered diffuser globe and fixture 400, or solar luminaire, according to another example embodiment of the present invention. FIG. 5B illustrates a side elevation view of the solar powered diffuser globe and fixture of FIG. 5A. Reference is now made to FIGS. 5A and 5B.

The lighting device 400 can include, for example, a hook-shaped tubular conduit 405. It should be understood, however, that the conduit 405 need not be tubular, nor hook-shaped, but rather, can take any suitable shape and be comprised of any suitable insulating and/or current-conductive material. A solar panel 410 is coupled to the hook end 415 of the tubular conduit 405. The solar panel 410 is disposed at an acute angle θ relative to a normal 420. A body member 425 has an opening 430 therein, the tubular conduit 405 extending through the opening 430 and coupled to the body member 425. A diffuser globe 135 is coupled to the shank end 435 of the tubular conduit 405.

The lighting device 400 can include a battery pack 440 configured to hold one or more rechargeable batteries 445. The battery pack 440 is disposed within the body member 425 and electrically coupled to the solar panel 410 for recharging. One or more light emitting diodes 455 are coupled to the battery pack 440. The battery pack 440 can discharge into the one or more LEDs 455 to cause light to be emitted therefrom.

The lighting device 400 can further include an actuator 450 coupled to the battery pack 440 and structured to electrically connect, when actuated, the one or more batteries 445 to the one or more LEDs 455 so that light 465 is emitted from the diffuser globe 135. The actuator 450 can be a button, switch, connector, light sensor, or the like. The actuator can be automatically actuated when daylight is low or nighttime has commenced, so that the one or more LEDs 455 can be powered by the battery pack 440. Electricity can be generated and stored in batteries sized for critical load of desired light output. Such power supply may be suitable for on-demand use, or off-grid applications.

The tubular conduit 405 can be coupled to the body member 425 using one or more grommets 470. The lighting device 400 can include a first insulator sleeve 475 disposed around the hook end 415 of the tubular conduit 405 and coupled to the solar panel 410, and a second insulator sleeve 480 disposed around the shank end 435 of the tubular conduit 405. The diffuser globe 135 is compression fitted to the second insulator sleeve 480 through an opening 485 of the diffuser globe 135. The lighting device 400 can further include a removable cap 490 disposed atop the body member 425 for providing access to the battery pack 440. The body member 425 can be affixed to a building, a street lamp post, a sidewalk, and so forth.

Figure 6:
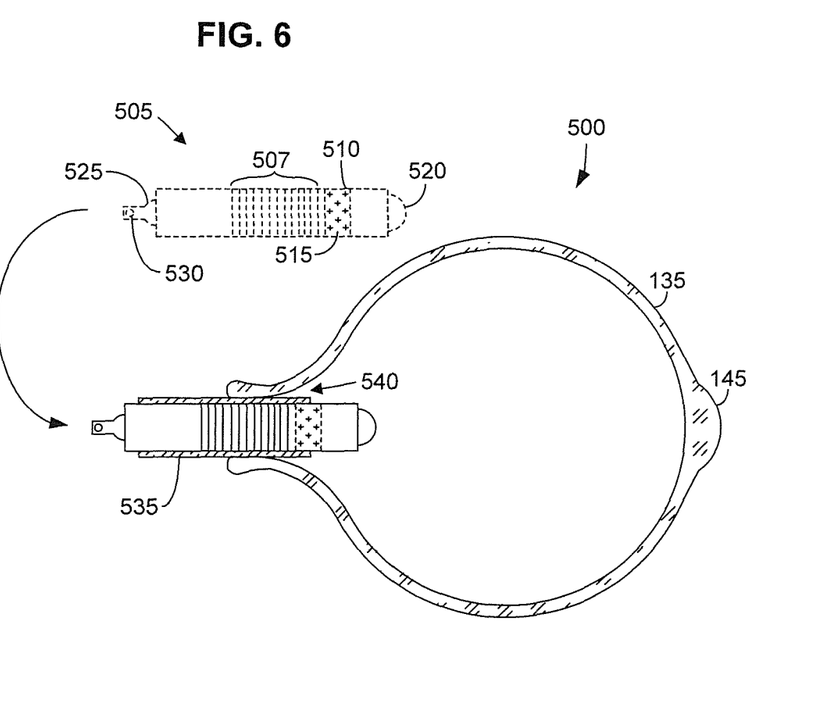
FIG. 6 illustrates a cross sectional view of a portable lighting device according to yet another example embodiment of the present invention.

FIG. 6 illustrates a cross sectional view of a portable lighting device 500 according to yet another example embodiment of the present invention. The portable lighting device 500 can include a grip and lamp assembly 505. The grip and lamp assembly 505 can include a raised grip portion 507 for gripping the lighting device 500, a battery chamber 510 structured to hold one or more cell batteries 515, one or more LEDs 520, and an on-off push button 525 for controlling the one or more LEDs 520. The on-off push button 525 can include a hole 530 for attachment, for example, to a lanyard or other type of tether or control wire.

An insulator sleeve 535 is disposed around at least a portion of the grip and lamp assembly 505. A diffuser globe 135 is compression fitted to the insulator sleeve 535 through an opening 540 thereof, so that the insulator sleeve 535 forms a water tight seal between the diffuser globe 135 and the grip and lamp assembly 505. The diffuser globe 135 includes a concentrated region 145 that is structured to refract light 150 outwardly 155 from the diffuser globe 135 and inwardly 160 within the diffuser globe 135, as described above. The lighting device 500 can be a portable torch, flashlight, and/or float.

Figure 7A:
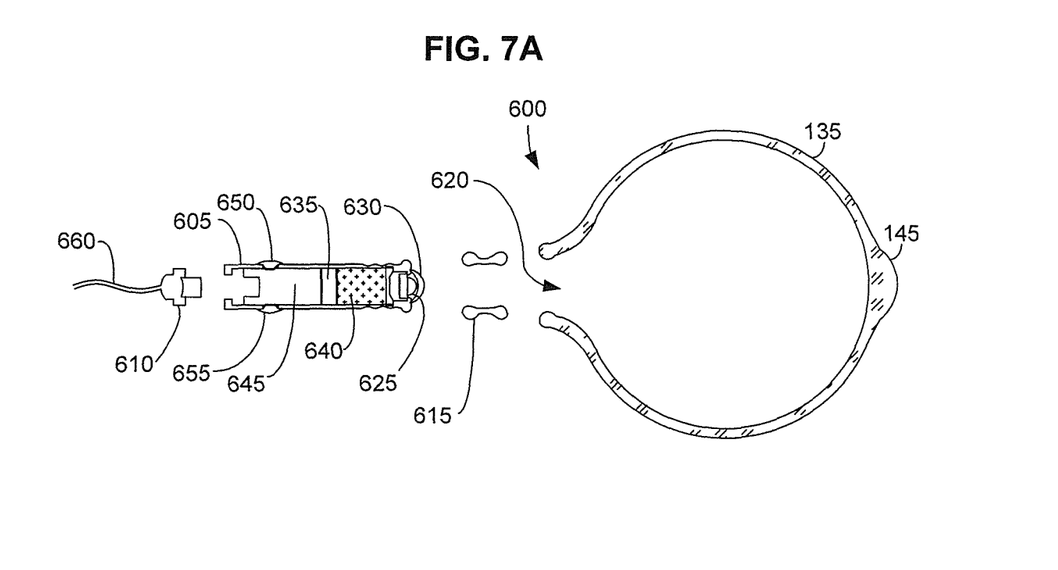
FIG. 7A illustrates an exploded view of a globe luminaire according to still another example embodiment of the present invention.
Figure 7B:
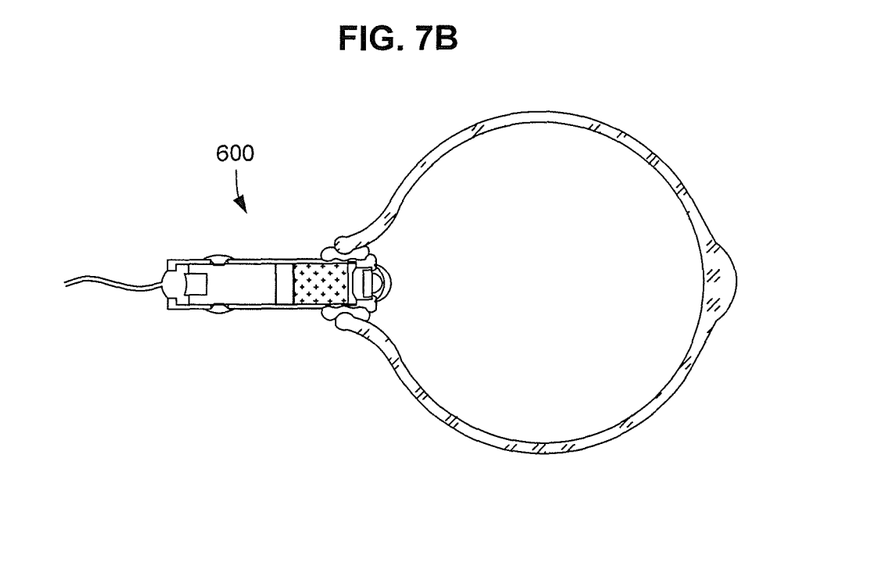
FIG. 7B illustrates an assembled view of the globe luminaire of FIG. 7A.

FIG. 7A illustrates an exploded view of a globe luminaire 600 according to still another example embodiment of the present invention. FIG. 7B illustrates an assembled view of the globe luminaire 600 of FIG. 7A. Reference is now made to FIGS. 7A and 7B.

The globe luminaire 600 can include some or all of the properties mentioned above such as silver fumed or glass properties. It should be understood, however, that the globe luminaire 600 need not include all of the properties described above. The globe luminaire 600 is constructed for interior or exterior durability and operation.

In some embodiments, the globe luminaire 600 is a stand-alone lighting device. In some embodiments, the globe luminaire 600 is a pendant, which can be hung, for example, from a ceiling, either individually or grouped with other luminaires. In some embodiments, multiple globe luminaires are coupled to a chandelier or other lamp fixture. In some embodiments, the globe luminaire 600 is mounted to a surface. In some embodiments, the globe luminaire 600 is waterproof float, which can be situated individually or grouped with other luminaires in a body of water.

The globe luminaire 600 includes a housing 605. The housing 605 is structured to receive a water proof keyed plug 610 to form a watertight seal between the keyed plug 610 and the housing 605. The keyed plug 610 can include, for example, an electrical interface such as a USB or USB 2.0 connector. It should be understood that other types of electrical interfaces can be used.

A waterproof gasket 615 is disposed around at least a portion of the housing 605. A diffuser globe 135 is compression fitted to the waterproof gasket 615 through an opening 620 thereof, so that the gasket 615 forms a water tight seal between the diffuser globe 135 and the housing 605.

The globe luminaire 600 can further include one or more red-green-blue (RGB) light emitting diodes (LEDs) 625 disposed at least partially within the housing 605, and configured to produce a plurality of colors of light including white light. It should be understood that other types of LEDs can be used, such as those described above. An internal diffuser 630 can be included therein to diffuse light inward of the diffuser globe 135. The diffuser globe 135 is structured to diffuse light inward and outward of the diffuser globe 135, as described above.

The globe luminaire 600 further includes an insulator 635 disposed within the housing 605. One or more batteries 640 are disposed within the housing 605 and between the insulator 635 and the one or more RGB LEDs 625. A control circuit 645 is disposed within the housing 605 and configured or otherwise programmed to automatically control a mode and a brightness level of light emitted by the one or more RGB LEDs 625. In addition, the control circuit 645 can be programmed to control the color emitted by the LEDs 625. Moreover, the control circuit 645 can be programmed to control the timing of transitions of light from one color to another, from an off state to an on state, and/or from an on state to an off state. Multiple globe luminaires 600 can be controlled and operated independently, but when viewed together such as in an arranged group, can seem as though a coordinated lighting show is occurring.

A first actuator 650 can provide manual control of the brightness level of light emitted by the one or more RGB LEDs 625. A second actuator 655 can provide manual control of the mode of light emitted by the one or more RGB LEDs 625. The actuators 650 and 655 can be buttons, switches, sensors, or the like.

The globe luminaire 600 can further include a waterproof cord 660 coupled to the keyed plug 610. The cord 660 can include one or more conductors disposed therein for providing power to the one or more RGB LEDs 625 and/or for providing control signals for operating the one or more RGB LEDs 625. The control signals sent over the conductor 660 can control the mode, the brightness level, the color, the timing of transitions of light from one color to another, and so forth, similar to the automatic control mechanism mentioned above, but instead controlled remotely using the conductor 660. In some embodiments, the housing 605, the keyed plug 610, the gasket 615, and the diffuser globe 135 comprise a remote controllable, waterproof, and floatable lighting device.

In some embodiments, the globe luminaire 600 can operate in association with a group of luminaires, all of which draw power from a common source. Alternatively, the globe luminaire 600 can operate autonomously, drawing power from the one or more batteries 640 that are disposed internally within the housing 605. The control circuit 645 of the globe luminaire 600 can cause the luminaire to switch from the common source to the internal power source in response to an event, such as an interruption of power delivered by the common source.

Similarly, when power is restored, the control circuit 645 can cause the luminaire 600 to switch back to the common power source. Moreover, the control circuit 645 can cause the luminaire to enter a "battery saving" mode in which the LEDs 625 periodically blink, or otherwise shine in a color that draws less power, such as in a red LED mode. This provides, for example, a beneficial automatic emergency lighting environment in the case of a power disruption.

In some embodiments, the globe luminaire 600 can be one of multiple luminaires that are centrally controlled by a common controller. Control signals can be transmitted to each luminaire over the conductor 660. Alternatively, or in addition to central control, each luminaire 600 can operate autonomously in response to the individual internal control circuits 645, which are programmable to adjust operating characteristics of the LEDs 625, as described above.

In some embodiments, the luminaire 600 is individually identifiable from among a group of luminaires, programmable, and/or linkable to other luminaires or devices.

In some embodiments, the internal control circuit 645 is automatically bypassed when connected to a common power source or common controller. Similarly, the internal control circuit 645 can be automatically engaged or enabled when the luminaire 600 is connected to the common power source or common controller. In this fashion, a "plug and play" installation characteristic facilitates the deployment and installation of the luminaires. In other words, the luminaires are easily removed and/or installed individually or as a group.

Figure 8:
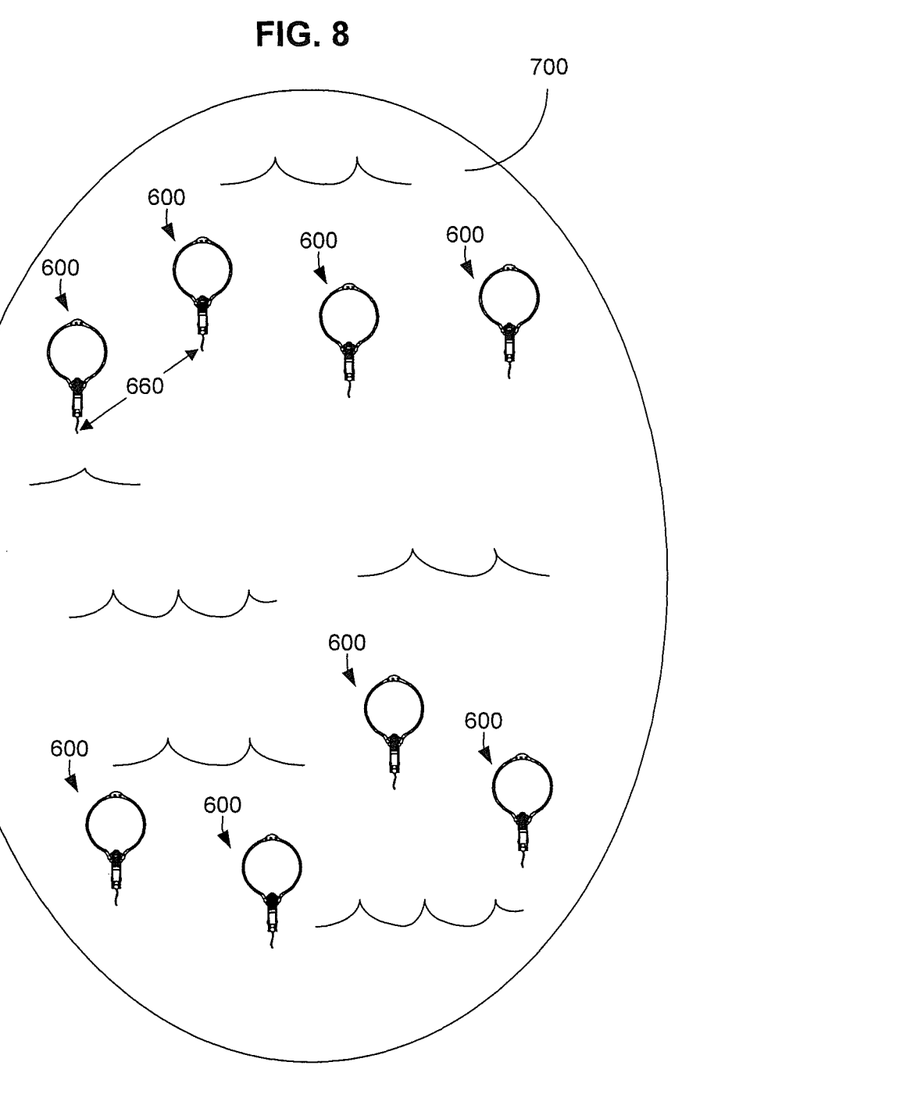
FIG. 8 illustrates a body of water in which multiple globe luminaire floats are located and controlled according to some embodiments of the present invention.

FIG. 8 illustrates a body of water 700 in which multiple globe luminaire floats 600 are located and controlled according to some embodiments of the present invention. It should be understood that the body of water 700 is illustrative only, and any type of body of water or the like can benefit from the example embodiments described herein.

The floats 600 can be powered and/or controlled remotely using individual conductors 660. Alternatively, the floats 600 can be automatically controlled using the control circuit 645 in each float 600, as described above. Moreover, the floats 600 can be automatically remotely controlled using either or both of the conductor 660 and the control circuit 645. Whether controlled remotely or locally, automatically or manually, the floats 600 can present a visually pleasing display of light emissions and enhance the elegance and lighting of any setting.

Although the foregoing discussion has focused on particular embodiments, other configurations are contemplated. For instance, the lighting devices described herein can include a power supply. Energy can be from sources generated, stored, and/or converted to provide energy to the lamps of the lighting device. The power supply may be provided as an AC to DC power supply and include a converter sized to meet the load of the lighting device and lamp specification. In some embodiments, power supplies similar to those used for phone chargers and PCs may be used.

In some embodiments, the power supply may be provided as a battery (e.g., for primary or back-up power). Batteries are suitable where continuous electricity is available and can store adequate emergency lighting during power outages.

In some embodiments, the power supply may be provided by solar, wind, and/or hydro direct power. Electricity generation can be sized to meet critical load of desired light output. Such power supply may be suitable for areas with no natural light source or no energy storage.

In some embodiments, the power supply may be provided by solar, wind, and/or hydro stored power. Electricity can be generated and stored in batteries sized for critical load of desired light output. Such power supply may be suitable for on-demand use, or off-grid applications.

In some embodiments, the power supply may be provided by portable power solutions. Such power supply may be suitable for handheld and task-oriented lighting demand.

In some embodiments, lighting device includes a chandelier-type structure to support multiple lamps and diffuser globes and may be hung from a supporting member. The chandelier-type structure may be provided in any desired configuration based on design requirements, lumen output, lamp color, etc. A controller may be coupled to the lamps through the chandelier-type structure.

In some embodiments, the lighting device is a surface-mount structure to support one or more lamps and diffuser globes, which may be mounted to any surface by any known means (e.g., brackets).

In some embodiments, the lighting device is a pendant-type structure for supporting a lamp and diffuser globe, which may be hung from above.

In some embodiments, the lighting device is adapted to be connected to any existing track lighting hardware.

In some embodiments, a portable lighting device is provided for use as or with a flashlight, float, solar luminaire, and the like.

Even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

The following discussion is intended to provide a brief, general description of a suitable machine or machines in which certain aspects of the invention can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciated that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the invention can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Other similar or non-similar modifications can be made without deviating from the intended scope of the invention. Accordingly, the invention is not limited except as by the appended claims.

The invention claimed is:

1. A lighting device, comprising:
   a tubular current-conductive housing;
   a lamp assembly coupled to the tubular current-conductive housing, the lamp assembly including at least one lamp that is electrically coupled to the tubular current-conductive housing;
   an insulator sleeve disposed around an end portion of the tubular current-conductive housing and around at least a portion of the lamp assembly;
   a diffuser globe compression fitted to the insulator sleeve through an opening thereof, the diffuser globe including a concentrated region that is structured to refract light outwardly from the diffuser globe and inwardly within the diffuser globe;
   a shatter resistant glow-in-the dark protective coating disposed on an outer surface of the diffuser globe;
   a first conductor coupled to a resistor, wherein the resistor is coupled to a positive terminal of the at least one lamp; and
   a second conductor coupled to a negative terminal of the at least one lamp.

2. The lighting device of claim 1, wherein at least one of an inner surface and an outer surface of the diffuser globe has deposited thereon silver particulates structured to reflect portions of the light outwardly from the diffuser globe and inwardly within the diffuser globe.

3. The lighting device of claim 1, wherein the concentrated region is nipple shaped.

4. The lighting device of claim 1, wherein:
   the at least one lamp includes one or more light emitting diodes (LEDs); and
   the lamp assembly includes a heat sink structured to dissipate heat away from the one or more LEDs.

5. The lighting device of claim 1, wherein the second conductor is coupled to the tubular current-conductive housing.

6. The lighting device of claim 1, further comprising an internal diffuser disposed within the diffuser globe and coupled to the lamp assembly using the insulator sleeve, wherein the internal diffuser is structured to redirect at least a portion of the light toward the concentrated region to increase the intensity of the light emitted through the concentrated region.

7. A lighting device, comprising:
   a hook-shaped tubular conduit;
   a solar panel coupled to the hook end of the tubular conduit, wherein the solar panel is disposed at an acute angle θ relative to a normal;
   a body member having an opening therein, the tubular conduit extending through the opening and coupled to the body member; and
   a diffuser globe coupled to the shank end of the tubular conduit.

8. The lighting device of claim 7, further comprising:
   a battery pack configured to hold one or more rechargeable batteries, wherein the battery pack is disposed within the body member and electrically coupled to the solar panel for recharging; and
   one or more light emitting diodes (LEDs) coupled to the battery pack.

9. The lighting device of claim 8, further comprising:
   an actuator coupled to the battery pack and structured to electrically connect, when actuated, the one or more batteries to the one or more LEDs so that light is emitted from the diffuser globe.

10. The lighting device of claim 7, wherein the tubular conduit is coupled to the body member using one or more grommets.

11. The lighting device of claim 7, further comprising:
    a first insulator sleeve disposed around the hook end of the tubular conduit and coupled to the solar panel;
    a second insulator sleeve disposed around the shank end of the tubular conduit,
    wherein the diffuser globe is compression fitted to the second insulator sleeve through an opening of the diffuser globe.

12. The lighting device of claim 7, further comprising a removable cap disposed atop the body member.

13. A portable lighting device, comprising:
a grip and lamp assembly including:
a raised grip portion for gripping the lighting device;
a battery chamber structured to hold one or more cell batteries;
one or more light emitting diodes (LEDs); and
an on-off push button for controlling the one or more LEDs, wherein the on-off push button includes a hole;
an insulator sleeve disposed around at least a portion of the grip and lamp assembly; and
a diffuser globe compression fitted to the insulator sleeve through an opening thereof, so that the insulator sleeve forms a water tight seal between the diffuser globe and the grip and lamp assembly,
wherein the diffuser globe includes a concentrated region that is structured to refract light outwardly from the diffuser globe and inwardly within the diffuser globe.

14. A globe luminaire, comprising:
a housing;
a waterproof keyed plug, wherein the housing is structured to receive the keyed plug to form a watertight seal between the keyed plug and the housing;
a waterproof gasket disposed around at least a portion of the housing; and
a diffuser globe compression fitted to the waterproof gasket through an opening thereof, so that the gasket forms a water tight seal between the diffuser globe and the housing.

15. The globe luminaire of claim 14, further comprising:
one or more red-green-blue (RGB) light emitting diodes (LEDs) disposed at least partially within the housing, and configured to produce a plurality of colors of light including white light;
an internal diffuser structured to diffuse light inward of the diffuser globe, wherein the diffuser globe is structured to diffuse light inward and outward of the diffuser globe.

16. The globe luminaire of claim 14, further comprising:
an insulator disposed within the housing;
one or more batteries disposed within the housing and between the insulator and the one or more RGB LEDs; and
a control circuit disposed within the housing and configured to automatically control a mode and a brightness level of light emitted by the one or more RGB LEDs.

17. The globe luminaire of claim 16, further comprising:
a first actuator structured to provide manual control of the brightness level of light emitted by the one or more RGB LEDs; and
a second actuator structured to provide manual control of the mode of light emitted by the one or more RGB LEDs.

18. The globe luminaire of claim 15, further comprising:
a waterproof cord coupled to the keyed plug, wherein the cord includes a first conductor disposed therein for providing power to the one or more RGB LEDs and a second conductor disposed therein for providing control signals for operating the one or more RGB LEDs.

19. The globe luminaire of claim 14, wherein the housing, the keyed plug, the gasket, and the diffuser globe comprise a remote controllable, programmable, rechargeable, waterproof, and floatable lighting device.

* * * * *